(12) United States Patent
Nakamura et al.

(10) Patent No.: US 9,272,494 B2
(45) Date of Patent: Mar. 1, 2016

(54) STICKING APPARATUS AND STICKING METHOD

(71) Applicant: Tokyo Ohka Kogyo Co., Ltd., Kawasaki (JP)

(72) Inventors: Akihiko Nakamura, Kawasaki (JP); Yoshihiro Inao, Kawasaki (JP); Shigeru Kato, Kawasaki (JP)

(73) Assignee: TOKYO OHKA KOGYO CO., LTD., Kawasaki-Shi (JP)

( * ) Notice: Subject to any disclaimer, the term of this patent is extended or adjusted under 35 U.S.C. 154(b) by 3 days.

(21) Appl. No.: 14/270,024

(22) Filed: May 5, 2014

(65) Prior Publication Data

US 2014/0332147 A1 Nov. 13, 2014

(30) Foreign Application Priority Data

May 8, 2013 (JP) ................................. 2013-098808

(51) Int. Cl.
| | |
|---|---|
| *B30B 15/06* | (2006.01) |
| *B32B 37/10* | (2006.01) |
| *B30B 15/04* | (2006.01) |
| *B32B 37/00* | (2006.01) |
| *B32B 37/06* | (2006.01) |
| *B32B 37/12* | (2006.01) |
| *B32B 38/18* | (2006.01) |

(52) U.S. Cl.
CPC ............... *B32B 37/10* (2013.01); *B30B 15/045* (2013.01); *B30B 15/064* (2013.01); *B32B 37/0046* (2013.01); *B32B 37/0015* (2013.01); *B32B 37/06* (2013.01); *B32B 37/1284* (2013.01); *B32B 38/1833* (2013.01); *B32B 2309/02* (2013.01); *B32B 2309/10* (2013.01); *B32B 2309/12* (2013.01); *B32B 2457/14* (2013.01)

(58) Field of Classification Search
None
See application file for complete search history.

(56) References Cited

U.S. PATENT DOCUMENTS

| | | | | |
|---|---|---|---|---|
| 6,849,522 | B2 * | 2/2005 | Ohya et al. ................. | 438/455 |
| 7,160,177 | B2 * | 1/2007 | Herold et al. ............... | 451/41 |
| 2002/0083849 | A1 | 7/2002 | Ohta et al. | |

FOREIGN PATENT DOCUMENTS

| | | | |
|---|---|---|---|
| BE | 1010361 A6 | * | 7/1998 |
| JP | 2002-192394 | | 7/2002 |

* cited by examiner

*Primary Examiner* — Barbara J Musser
(74) *Attorney, Agent, or Firm* — Knobbe Martens Olson & Bear LLP

(57) ABSTRACT

A sticking apparatus including a pair of plate members sandwiching a laminate between the pair of plate members, and supporting members supporting the plate members. The supporting members supporting at least one of the plate members are located in a form of multiple dots or lines adjacent to each other at regular intervals on the plate member.

9 Claims, 3 Drawing Sheets

FIG. 3

|  | Example 1 | Example 2 | Comparative Example |
|---|---|---|---|
| Sticking | B | A | D |
| Pressure Distribution (Max-Min) | 675 KPa | 538 KPa | 798 KPa |
| Uniformity (TTV) | 3.0 μm | 2.6 μm | 3.6 μm |

STICKING APPARATUS AND STICKING METHOD

CROSS-REFERENCE TO RELATED APPLICATIONS

The present application claims priority under 35 U.S.C. §119(a)-(d) to Japanese Patent Application No. 2013-098808, filed May 8, 2013, the content of which is incorporated herein by reference.

BACKGROUND OF THE INVENTION

1. Field of the Invention

The present invention relates to a sticking apparatus for and a sticking method of sticking a substrate and a support to each other through an adhesive agent in a laminate in which the substrate and the support are laminated.

2. Background Art

According to advanced functionality of a mobile phone, digital AV equipment, an IC card, and the like, a demand to reduce the size and thickness of a semiconductor silicon chip (hereinafter referred to as a chip) which is mounted so as to highly integrate the chips in a package is increasing. In order to realize the higher integration of the chips in the package, it is necessary to lower the thickness of the chip to a range of greater than or equal to 25 μm and less than or equal to 150 μm.

However, a semiconductor wafer (hereinafter referred to as a wafer) which is a base of the chip is thinned by grinding, and thus the strength thereof is weakened and cracks or warpage easily occurs in the wafer. Further, since it is difficult to automatically transport the wafer having strength weakened due to thinning, it is necessary to transport the wafer by a person's hands and the handling thereof is complicated.

For this reason, a wafer support system to prevent occurrence of cracks and warpage appearing on a wafer by maintaining the strength of the wafer by bonding a plate made of glass, rigid plastic, or the like, which is referred to as a support plate, to the wafer to be ground has been developed. Since it is possible to maintain the strength of the wafer by the wafer support system, it is possible to automate the transport of the thinned semiconductor wafer.

Here, the wafer and the support plate are bonded to each other by using an adhesive tape, thermoplastic resin, an adhesive agent, or the like.

In JP-A-2002-192394, a press working method for an inorganic substrate is described which is performed by installing a combined set of a laminated material that includes an inorganic substrate made of a semiconductor or ceramics, and an auxiliary material for lamination processing, between a pair of upper and lower heating platens heated to a predetermined temperature in a reduced-pressure press machine, bringing the pair of heating platens into contact with the combined set, and then applying low-pressure load up to 0.05 MPa for 10 seconds or more from at least pressurization start.

SUMMARY OF THE INVENTION

However, in a case of using the press working method of the related art as described in JP-A-2002-192394 in order to stick a substrate such as a wafer substrate, for example, and a support supporting the substrate to each other through an adhesive layer, the following problem occurs. That is, in order to uniformly stick the substrate and the support to each other, it is necessary to increase a pressing force by the heating platen as the size of the substrate increases. For this reason, it is necessary to increase a pressing force which is applied by the pair of upper and lower heating platens, and thus the heating platens themselves are bent by the pressing force. Therefore, it becomes difficult to uniformly apply pressure in a surface where the heating platens come into contact with each other. For this reason, it is difficult for the adhesive layer to have a uniform thickness between the substrate and the support, and therefore, it becomes difficult to uniformly stick the substrate and the support to each other.

The present invention has been made in view of the above-described problem and has an object to provide a sticking apparatus in which it is possible to uniformly stick a substrate and a support to each other through an adhesive layer.

According to an aspect of the present invention, there is provided a sticking apparatus for manufacturing a laminate which is formed by laminating a substrate, an adhesive layer, and a support in this order by sticking the substrate and the support to each other through the adhesive layer, the sticking apparatus including: a pair of plate members which sandwiches the laminate therebetween; and supporting members which support the plate members, wherein the supporting member supporting at least one of the plate members is located in a form of a plurality of dots or lines adjacent to each other at regular intervals on the plate member.

Further, according to another aspect of the present invention, there is provided a sticking method for manufacturing a laminate which is formed by laminating a substrate, an adhesive layer, and a support in this order by sticking the substrate and the support to each other through the adhesive layer, the sticking method including: supporting at least one plate member of a pair of plate members sandwiching the laminate therebetween, by supporting members located in a form of a plurality of dots or lines adjacent to each other at regular intervals on the plate member, and pressing the plate members by the supporting members when sticking the substrate and the support to each other.

According to the present invention, the effect where it is possible to uniformly stick the substrate and the support to each other through the adhesive layer is exhibited.

BRIEF DESCRIPTION OF THE DRAWINGS

FIG. 3 is a diagram describing a pressure distribution in a plate member when using the sticking apparatuses according to the embodiment of the present invention and the comparative example.

DETAILED DESCRIPTION OF THE INVENTION

Figure 1A:
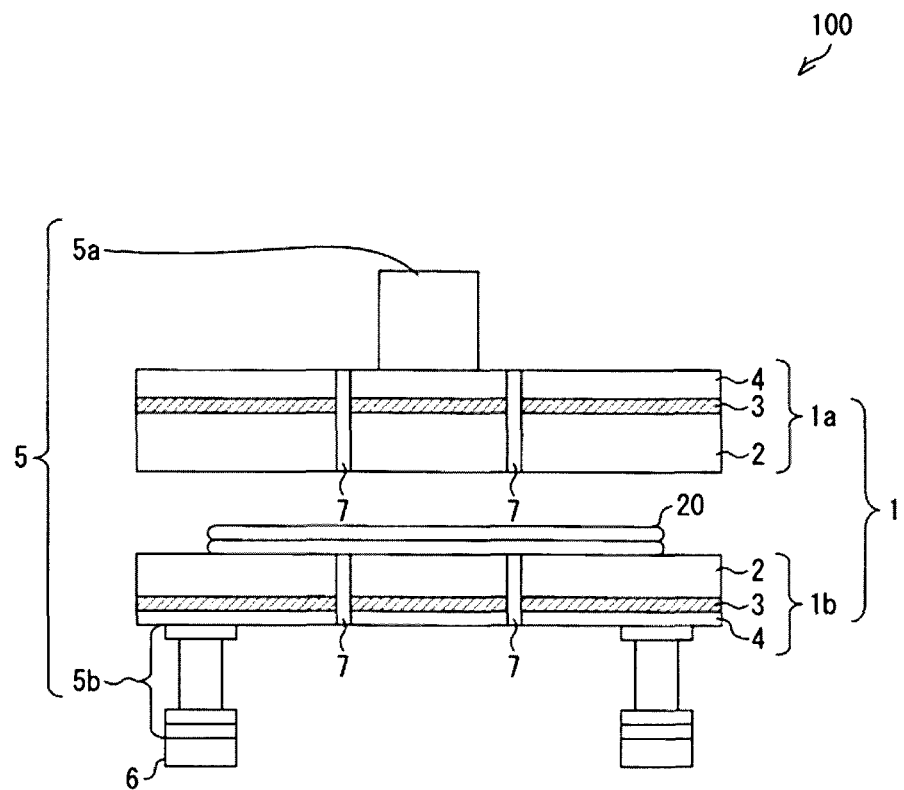
FIGS. 1A and 1B are schematic diagrams describing the structure of a sticking apparatus according to an embodiment of the present invention.

A sticking apparatus according to an embodiment of the present invention is a sticking apparatus for manufacturing a laminate which is formed by laminating a substrate, an adhesive layer, and a support in this order by sticking the substrate and the support to each other through the adhesive layer, and is configured to include a pair of plate members which sandwiches the laminate therebetween, and supporting members which support the plate members, wherein the supporting member supporting at least one of the plate members is located in a form of a plurality of dots or lines adjacent to each other at regular intervals on the plate member.

Accordingly, a pressing force which is applied to the plate member by the supporting member is not locally concentrated in a surface where the pair of plate members sandwiching the laminate therebetween come into contact with each other. That is, the supporting member can uniformly press the plate member. Therefore, it is possible to uniformly stick the substrate and a support plate (the support) to each other through the adhesive layer.

Laminate

The laminate which is a target to be stuck is formed by laminating a substrate, an adhesive layer which includes, for example, thermoplastic resin, and a support plate (a support) which supports the substrate, in this order. That is, the laminate is formed by forming the adhesive layer by applying an adhesive agent onto any one of the substrate and the support plate or bonding an adhesive tape formed by applying an adhesive agent thereto to any one of the substrate and the support plate, and then laminating the substrate, the adhesive layer, and the support plate in this order. Then, after the laminate is laminated and formed in advance, the laminate is placed (set) at a predetermined position of a sticking apparatus by a transport device such as a robot arm, for example. It is more preferable that the laminate be temporarily fixed, in a state of being laminated and formed in advance, such that the relative positions of the substrate and the support plate are not shifted. Or, the laminate may be placed (set) at a predetermined position of a sticking apparatus by being formed by laminating the substrate and the support plate on a plate member of the sticking apparatus by a transport device such as a robot arm.

In addition, a forming method of and a forming apparatus for forming the laminate, that is, a method of forming an adhesive layer or an apparatus for forming an adhesive layer and a method of superimposing or an apparatus for superimposing the substrate and the support plate on one another are not particularly limited, and various methods or apparatuses can be adopted. In the present invention, it is acceptable if the laminate is formed by laminating the substrate, the adhesive layer, and the support plate in this order, at the point in time when a pressing force is applied thereto by a sticking apparatus.

The substrate is subjected to processes of thinning, transport, mounting, and the like in a state of being supported on (stuck to) the support plate. The substrate is not limited to a wafer substrate and may be, for example, any substrate such as a ceramics substrate, a thin film substrate, or a flexible substrate, which requires support by the support plate.

The support plate is a support which supports the substrate, and is stuck to the substrate through the adhesive layer. For this reason, it is favorable if the support plate has strength required to prevent breakage or deformation of the substrate during the processes of thinning, transport, mounting, and the like of the substrate, and it is preferable that the support plate be more lightweight. From the viewpoint of the above, it is more preferable that the support plate be configured by glass, silicon, acrylic resin, ceramics, a silicon wafer, or the like.

It is favorable if an adhesive agent configuring the adhesive layer contain, for example, thermoplastic resin in which thermal fluidity is improved by heating, as an adhesive material. As the thermoplastic resin, for example, acrylic resin, styrene-based resin, maleimide-based resin, hydrocarbon-based resin, elastomer, or the like can be given.

An adhesive layer forming method, that is, an application method of applying an adhesive agent onto the substrate or the support plate, or a forming method of forming an adhesive tape by applying an adhesive agent onto a base material is not particularly limited. However, as a method of applying an adhesive agent, for example, a spin coating method, a dipping method, a roller blade method, a doctor blade method, a spraying method, an application method using a slit nozzle, or the like can be given.

It is favorable if the thickness of the adhesive layer is appropriately set according to the types of the substrate and the support plate which are targets to be stuck, treatment to be performed on the substrate after sticking, or the like. However, it is preferable that the thickness of the adhesive layer be in a range of greater than or equal to 10 μm and less than or equal to 150 μm and it is more preferable that the thickness of the adhesive layer be in a range of greater than or equal to 15 μm and less than or equal to 100 μm.

In addition, when stripping the support plate from the substrate, it is favorable if the adhesive layer is dissolved by supplying solvent to the adhesive layer. In this way, the substrate and the support plate can be separated from each other. At this time, if a through-hole penetrating in a thickness direction of the support plate is formed in the support plate, since the solvent can be easily supplied to the adhesive layer through the through-hole, it is more preferable.

Further, a layer other than the adhesive layer may be further formed between the substrate and the support plate as long as the layer does not interfere with sticking. For example, a release layer which is transmuted by light irradiation may be formed between the support plate and the adhesive layer. The release layer is formed, whereby the substrate and the support plate can be easily separated from each other by performing light irradiation after the process of thinning, transport, mounting, or the like of the substrate.

Sticking Apparatus

Figure 1B:
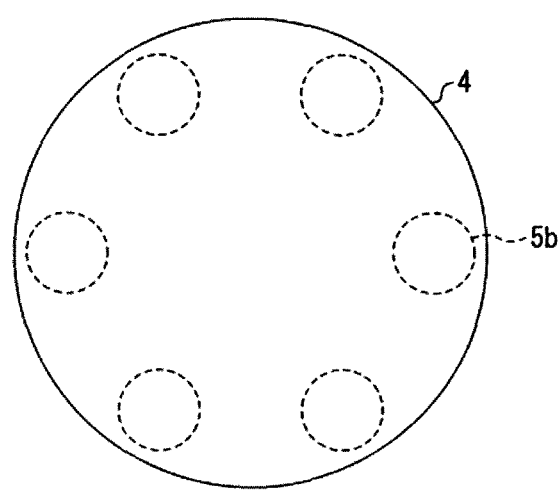

A sticking apparatus 100 according to an embodiment of the present invention will be described using FIGS. 1A and 1B. FIGS. 1A and 1B are schematic diagrams describing the structure of the sticking apparatus 100.

As shown in FIG. 1A, the sticking apparatus 100 is provided with a pair of plate members 1 which includes an upper plate member 1a and a lower plate member 1b, a supporting member 5a which supports the upper plate member 1a, and a supporting member 5b which supports the lower plate member 1b. Further, the supporting member 5a supports the upper plate member 1a. Further, as shown in FIG. 1B, the supporting members 5b are provided in the vicinity of an outer peripheral portion of the lower plate member 1b in a circular pattern so as to be adjacent to each other at regular intervals of 60°. Further, the supporting member 5b is provided with a shim (an adjusting member) 6. Further, each of the upper plate member 1a and the lower plate member 1b is provided with a press plate 2, a heater 3, a heat insulating material 4, and an opening portion 7. A void is present between the pair of plate members 1 and a laminate 20 can be set in the void. Further, the sticking apparatus 100 is accommodated in a chamber (not shown) which can be hermetically sealed at the time of sticking and the inside of which can be made to a reduced-pressure environment by using a suction device or the like.

The upper plate member 1a is supported by the supporting member 5a. The lower plate member 1b is supported by the supporting members 5b. The lower plate member 1b is disposed so as to face the upper plate member 1a. Further, a void is provided between the upper plate member 1a and the lower plate member 1b. For this reason, in the lower plate member 1b, the laminate 20 can be placed on the planar surface of the press plate 2 with which the lower plate member 1b is provided.

The press plates 2 are respectively provided at the mutually facing surfaces of the upper plate member 1a and the lower plate member 1b in the upper plate member 1a and the lower plate member 1b.

In the mutually facing surfaces of the press plates 2 of the upper plate member 1a and the lower plate member 1b, the surface thereof is formed such that the flatness thereof at the time of non-pressing is less than or equal to 1.0 μm. Here, the flatness is a numerical value indicating the degree of irregularity with respect to a planar surface, and the expression "flatness being less than or equal to 1.0 μm" means that the irregularity of the surface of the press plate 2 at the time of non-pressing is less than or equal to ±1.0 μm. Further, the press plate 2 has a thickness (thickness in a vertical direction) of greater than or equal to, for example, 35 mm so as to be able to reduce the amount of deflection at the time of pressing. Since the press plate 2 is formed of ceramic, it is possible to easily perform processing such that the flatness of the surface thereof becomes less than or equal to 1.0 μm. Further, since ceramic has a small coefficient of thermal expansion in comparison with metal, it is possible to reduce the curvature, the distortion, or the like of the surface of each press plate 2 at the time of pressing in a heating state. For this reason, the curvature, the distortion, or the like does not easily occur and it becomes easy to maintain the planarity (horizontality) of the mutually facing surfaces of the respective press plates 2.

The heater 3 is formed of a heating device such as a ribbon heater or a surface heater, for example, and heats the laminate 20 by heating the press plate 2 when the press plate 2 applies a pressing force to the laminate 20. Accordingly, in a case of using an adhesive layer which includes thermoplastic resin, it is possible to successfully bond the substrate and the support plate to each other by melting the adhesive layer of the laminate 20. It is favorable if the heating temperature of the heater 3 is appropriately set according to the glass transition temperature or the like of the thermoplastic resin. However, the heating temperature of the heater 3 may be set so as to heat the laminate to a range of greater than or equal to 50° C. and less than or equal to 300° C., for example.

The heat insulating material 4 is made so as to prevent the heat of the heater 3 from being transferred to a supporting member 5.

The supporting member 5a is fixed so as to be movable in the vertical direction in FIG. 1A. The supporting member 5a moves in an upward direction, thereby being able to move the upper plate member 1a in the upward direction. Further, the supporting member 5a moves in a downward direction, whereby a pressing force can also be applied to the upper plate member 1a. Due to the pressing force, the upper plate member 1a presses the laminate 20 placed on the press plate 2 of the lower plate member 1b with the laminate 20 sandwiched therebetween.

As shown in FIG. 1B, the supporting members 5b are provided in the vicinity of the outer peripheral portion of the lower plate member 1b in a circular pattern so as to be adjacent to each other at regular intervals of 60°.

Here, it is preferable that the supporting member 5b be provided at a position distant from the center point of the lower plate member 1b in a radial direction in a range of greater than or equal to 65% of a radius and less than or equal to 95% of the radius. If the position in the radial direction from the center point of the lower plate member 1b of the supporting member 5b is in the above-described range, the pressing force which is applied by the supporting member 5a through the upper plate member 1a is uniformly applied to the inside of a surface where the press plates 2, with which the upper plate member 1a and the lower plate member 1b are respectively provided, come into contact with each other. More specifically, the pressing force is uniformly applied to not only the press plate 2 which is located inside a circle that is depicted by the supporting members 5b provided in a circular pattern at regular intervals of 60°, but also the press plate 2 which is located outside the circle. Therefore, even in a case where the diameter of the laminate 20 is large, the pressing force can be uniformly applied to the laminate 20. In addition, here, it is favorable if the center of gravity of the lower plate member 1b is selected as the center point of the lower plate member 1b. By selecting the center of gravity of the plate member as the center point, it is possible to appropriately determine the position of the supporting member even in a case where the plate member is not circular. Further, it is favorable if the diameter of each of the plurality of supporting members 5b is appropriately adjusted according to the intensity of the pressing force which is applied by the supporting member 5a.

Further, it is preferable that the pressing force which is transmitted to the laminate 20 through the pair of plate members 1 by the supporting member 5a be set such that, for example, in a case where the diameter of the substrate is 300 mm, load of greater than or equal to 1 t and less than or equal to 6 t is applied to the entire substrate. The pressing force which is applied to the laminate 20 is in the above-described range, whereby it is possible to uniformly and sufficiently press the entirety of the laminate 20.

In the sticking apparatus according to the embodiment of the present invention, a configuration is favorable in which the supporting member supporting at least one of the plate members is provided in a form of a plurality of dots or lines so as to be adjacent to each other at regular intervals. The sticking apparatus 100 shown in FIGS. 1A and 1B only shows a configuration example of the sticking apparatus according to the embodiment of the present invention and the present invention is not limited thereto.

In a case where each of supporting members supporting a pair of plate members has a single rod shape, a pressing force which is applied by the supporting member is concentrated on the site between a pair of supporting members in the pair of plate members. In contrast, the sticking apparatus according to the embodiment of the present invention has a configuration in which at least one of the supporting members is provided in a form of a plurality of dots or lines so as to be adjacent to each other at regular intervals, whereby a pressing force which is applied by the supporting member can be made more uniform.

Further, for example, in the sticking apparatus according to the embodiment of the present invention, a configuration is also acceptable in which a plurality of supporting members are provided in the vicinity of the outer peripheral portion of the plate member in a circular pattern so as to be adjacent to each other at regular intervals of 120°, 90°, 72°, 60°, or 45°.

Accordingly, the plurality of supporting members can be accurately provided with respect to the plate member so as to be adjacent to each other at regular intervals. Therefore, it is possible to more suitably uniformize a pressing force which is applied to the plate member by the supporting members. That is, it is preferable that the number of supporting members be any of 3, 4, 5, 6, and 8 such that the above-described intervals are obtained. By making the number of supporting members be the above-described number, a pressing force which is applied to the plate member can be made uniform, and in addition, it is possible to suppress the heat of the heater from being excessively released through the supporting members. In addition, it is favorable if the number of supporting members is appropriately selected in consideration of the shape or the diameter of the plate member.

Further, the configuration of the supporting member with which the sticking apparatus according to the embodiment of the present invention is provided is not only a configuration in which, for example, a columnar supporting member is provided in the form of a dot but may also be a configuration that performs support in the form of a line. As the configuration that performs support in the form of a line, for example, a configuration of supporting a plate member by a supporting member having a ring-shaped cross-sectional area can be given. Due to supporting a plate member in the form of a ring, that is, the form of a circular line, a pressing force which is applied to the plate member by the supporting members is not locally concentrated in a surface where a pair of plate members sandwiching a laminate therebetween comes into contact with each other. That is, the supporting members can uniformly press the plate member.

Further, in the sticking apparatus according to the embodiment of the present invention, a configuration is also acceptable in which a supporting member is further provided at the center point of the circle. In this way, the pair of supporting members can more suitably apply a uniform pressing force to the pair of the plate members.

If the supporting member is provided so as to be adjacent to each other at regular intervals, the supporting member supporting one of the plate members may be plural. That is, a configuration is also acceptable in which the supporting members supporting one of the plate members are provided so as to be plural and the supporting member supporting the other of the plate members is provided so as to be single. Further, the supporting members for both the plate members may be provided so as to be plural. Due to such a configuration, a pressing force which is applied to the plate members can be made uniform.

Further, it is favorable if the supporting member supporting at least one of the plate members is fixed so as to be movable in the vertical direction. It is favorable if a pressing force is applied to the laminate by at least one of a method of moving one of the supporting members in the downward direction and a method of moving the other of the supporting members in the upward direction.

Further, the supporting member may be provided with a heat insulating material, as necessary. By providing a heat insulating material in each of a plurality of supporting members, it is possible to prevent the heat of the heater from being excessively released through the supporting members.

The shim 6 is made of a steel sheet such as stainless steel having a thickness of greater than or equal to 5 µm and less than or equal to 100 µm. The thickness of the shim 6 need not be constant, and a plurality of types of shims 6 having different thicknesses may be appropriately used in combination. At the time of the adjustment of the supporting member by the shim 6, the adjustment may be performed while checking a pressure distribution of the inside of a surface where the press plate 2 of the upper plate member 1a and the press plate 2 of the lower plate member 1b come into contact with each other. In addition, the pressure distribution of the inside of a surface where the press plate 2 of the upper plate member 1a and the press plate 2 of the lower plate member 1b come into contact with each other can be measured by a well-known method such as total thickness variation (TTV) measurement or surface pressure distribution measurement. Further, the shim 6 may be fixed to the supporting member 5b by a plurality of bolts and nuts after the adjustment of the pressure distribution.

It is preferable that the difference between the maximum value and the minimum value of the pressure distribution of the pressing force which is applied to the upper plate member 1a and the lower plate member 1b be adjusted into a range of less than or equal to 700 kPa by the shim 6, and it is further preferable that the difference be adjusted into a range of less than or equal to 600 kPa. In order to accurately process the substrate to a thinness of greater than or equal to 25 µm and less than or equal to 150 µm, it is very important to make the thickness of the laminate 20 uniform. Here, the planarity of the surfaces of the pair of plate members 1 in the sticking apparatus 100, the height of each of the plurality of supporting members 5b, the planarity of an installation place of the sticking apparatus 100, and the like affect the thickness of the laminate 20. Here, it is favorable if the difference between the maximum value and the minimum value of the pressure distribution of the pressing force which is applied to the upper plate member 1a and the lower plate member 1b be adjusted so as to be within the above-described range by adjusting the height of the supporting member 5b by the shim 6. In this way, it is possible to accurately and uniformly stick the substrate and the support plate to each other through the adhesive layer in the laminate 20 for processing the substrate to a thinness of greater than or equal to 25 µm and less than or equal to 150 µm.

In addition, the sticking apparatus 100 can also have a configuration in which the supporting member 5b is not provided with the shim 6. Even if the shim 6 is not provided, in the sticking apparatus 100, at least one of the pair of supporting members 5 is provided in a plurality so as to be adjacent to each other at regular intervals, whereby it is possible to prevent a pressing force which is applied to the pair of plate members 1 from being locally concentrated.

The opening portions 7 are openings provided in the upper plate member 1a and the lower plate member 1b and a pin for sticking prevention or a pin for transport (not shown) can be provided inside.

When moving the upper plate member 1a in the upward direction after the substrate and the support plate are stuck to each other by applying pressure to the laminate 20, the pin for sticking prevention is extruded from the inside of the opening portion 7 of the upper plate member 1a to the outside. In this way, the pin for sticking prevention prevents the laminate 20 from being stuck to the upper plate member 1a due to the adhesive layer protruding due to the laminate 20 being pressed, or the like.

The pin for transport is extruded from the inside of the opening portion 7 of the lower plate member 1b to the outside when transporting the laminate 20 by a robot arm. In this way, the pin for transport can lift the laminate 20. Therefore, it is possible to make it easy for the robot arm to transport the laminate 20. In addition, the pin for transport can also act as a sticking prevention pin.

Sticking Method

A sticking method according to the embodiment of the present invention is a sticking method for manufacturing the laminate 20 which is formed by laminating a substrate, an adhesive layer, and a support in this order by sticking the substrate and the support to each other through the adhesive layer, and has a configuration which includes supporting at least one plate member of the pair of plate members 1 which sandwiches the laminate 20 therebetween, by the supporting members 5 located in a plurality of dot forms or line forms adjacent to each other at regular intervals on the plate member, and pressing the plate members 1 by the supporting members 5 when sticking the substrate and the support to each other.

Accordingly, a pressing force which is applied to the plate members 1 by the supporting members 5 is not locally concentrated in a surface where the pair of plate members 1 sandwiching the laminate therebetween come into contact with each other. That is, it is possible to obtain the same effect as that of using the sticking apparatus according to the embodiment of the present invention.

Further, the sticking method according to the embodiment of the present invention may have a configuration of adjusting the pressing force of the supporting member 5 pressing the plate member 1 such that a pressing force which is applied to the laminate 20 becomes uniform.

Specifically, in the sticking method described above, it is possible to adjust the pressing force by the supporting member 5 by the sticking apparatus 100 in which the height of the supporting member 5b is adjusted by the shim (the adjusting member) 6.

A sticking method for the laminate 20 using the sticking apparatus 100 having the above-described configuration will be specifically described.

First, the laminate 20 in which, for example, the substrate, the adhesive layer, and the support plate are laminated in this order and which is temporarily fixed such that the substrate and the support plate are not shifted is transported to the center of the press plate 2 of the upper plate member 1a in the sticking apparatus 100 accommodated in a chamber, by using the transport device such as a robot arm and is placed such that the substrate side becomes the bottom (a transport process). At this time, the inside of the chamber is in a reduced-pressure environment. Further, the pair of press plates 2 is heated to a temperature of greater than or equal to 100° C. and less than or equal to 300° C. in advance by the heaters 3.

Next, the press plate 2 of the upper plate member 1a is brought into contact with the support plate by moving the upper plate member 1a in the sticking apparatus 100 in the downward direction, and the laminate 20 is pressed by further moving the upper plate member 1a down. Here, a pressing force which is applied by the supporting member 5a supporting the upper plate member 1a is received by six supporting members 5b provided so as to be adjacent to each other at regular intervals. Therefore, the pressing force is applied to the laminate 20 by the supporting member 5a and the supporting members 5b in a state where the upper plate member 1a and the lower plate member 1b sandwich the laminate 20 therebetween. Here, the supporting members 5b are provided so as to be adjacent to each other at regular intervals. For this reason, the pressing force is uniformly applied without being locally concentrated between the supporting member 5a and one of the six supporting members 5b.

Further, during the pressing, the plate members 1 heat the laminate 20 (a sticking process and a heating process). That is, the substrate, the adhesive layer, and the support plate are pressed and heated under the reduced-pressure environment. It is preferable that the pressing force be set such that, for example, in a case where the diameter of the substrate is 300 mm, load of greater than or equal to 1 t and less than or equal to 6 t is applied to the entire substrate.

Here, it is preferable that the difference between the maximum value and the minimum value of the pressure distribution of the pressing force which is applied to the upper plate member 1a and the lower plate member 1b be adjusted into a range of less than or equal to 700 kPa, and it is further preferable that the difference be adjusted into a range of less than or equal to 600 kPa. In this embodiment, the pressure adjustment can be performed by the shim 6. Due to this adjustment, it is possible to adjust the pressing force such that the thickness of the laminate 20 becomes uniform, in consideration of factors such as the planarity of the surfaces of the pair of plate members 1, the height of each of the plurality of supporting members 5b, and the planarity of an installation place of the sticking apparatus 100. Therefore, it is possible to accurately and uniformly stick the substrate and the support plate to each other in the laminate 20 for processing the substrate to a thinness of greater than or equal to 25 μm and less than or equal to 150 μm.

Further, here, it is favorable if the adhesive layer is heated to, preferably, a temperature greater than or equal to a room temperature (23° C.), more preferably, a temperature greater than or equal to a glass transition point (Tg), from the viewpoint of, for example, the low-temperature adhesiveness (tackiness) of thermoplastic resin which is an adhesive material of the adhesive layer. Due to heating the adhesive layer in this manner, the thermal fluidity of the adhesive layer is improved, and thus the adhesive layer is easily deformed. Although it also depends on the quality of a material of the adhesive layer, that is, the thermoplastic resin which is an adhesive material, it is preferable that the temperature of a contact surface be in a range of greater than or equal to 23° C. and less than or equal to 250° C., and it is more preferable that the temperature of a contact surface be in a range of greater than or equal to 150° C. and less than or equal to 250° C. It is preferable that heating time, that is, pressing time be greater than or equal to 30 seconds and less than or equal to 20 minutes, and it is more preferable that the heating time, that is, the pressing time be greater than or equal to 30 seconds and less than or equal to 5 minutes. Due to pressing the substrate and the support plate while performing heating, the adhesive layer maintains thermal fluidity, is easily deformed in response to the pressing, and uniformly spreads. Therefore, it is possible to uniformly stick the substrate and the support plate to each other and there is no concern that poor sticking may occur.

The present invention is not limited to each embodiment described above, and various changes can be made within the scope of the claims, and embodiments which can be obtained by appropriately combining technical means respectively disclosed in different embodiments are also included in the technical scope of the present invention.

EXAMPLES

Evaluations described below were performed by using the respective sticking apparatuses. The sticking apparatuses used for the evaluations are as follows.

Example 1

A configuration in which the sticking apparatus 100 is not provided with the shim 6 (an apparatus which is provided with the six supporting members 5b)

Example 2

The sticking apparatus 100 (an apparatus in which the six supporting members 5b are adjusted by the shims 6)

Comparative Example

Figure 2A:
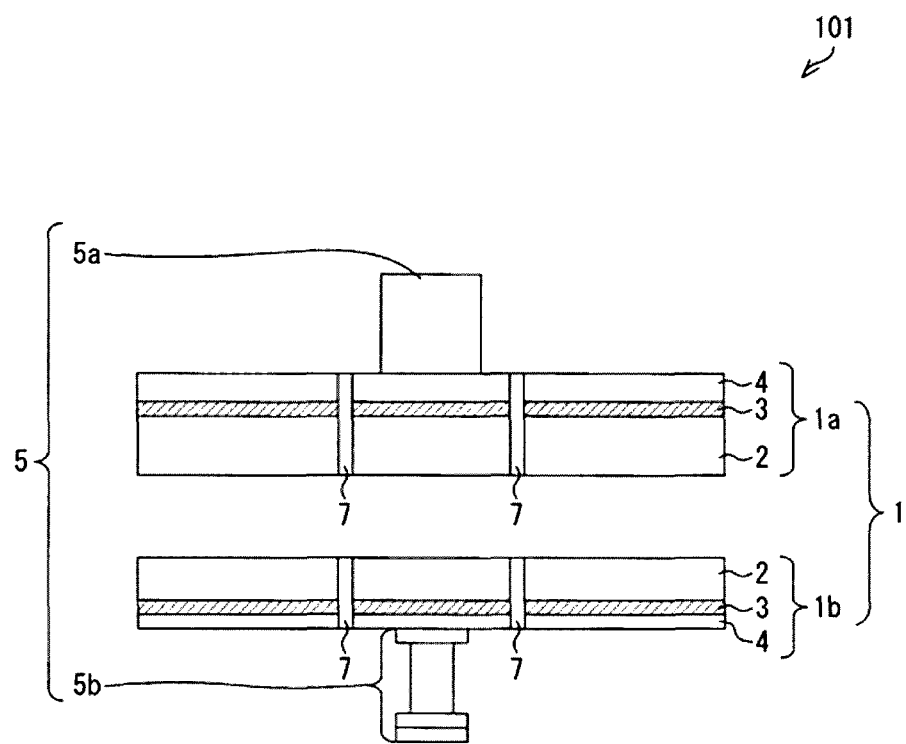
FIGS. 2A and 2B are schematic diagrams describing the structure of a sticking apparatus used in a comparative example.
Figure 2B:
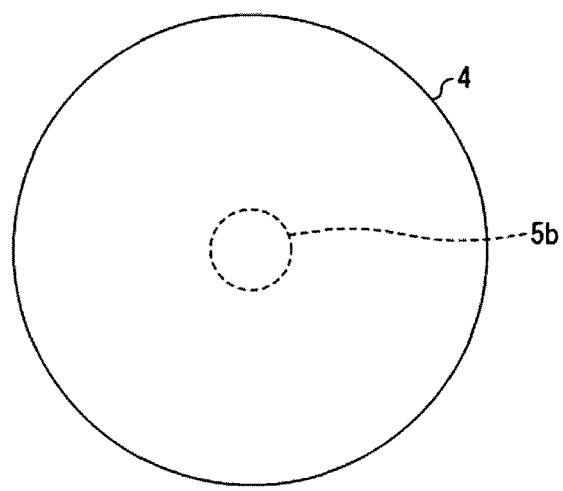

A sticking apparatus 101 shown in FIGS. 2A and 2B. The sticking apparatus 101 is an apparatus having the same configuration as the sticking apparatus 100 except that it is a configuration in which each of the supporting member 5a and the supporting member 5b is only one.

Evaluation of Pressure Distribution

In each of the sticking apparatuses according to Example 1, Example 2, and the comparative example, a pressure distribution when a pressing force was applied was evaluated.

The evaluation of the pressure distribution was performed by a numerical value measured by a pressure distribution measuring device manufactured by Nitta Corporation. In addition, after the press plate was heated up to 215° C. in each sticking apparatus, the pressure distribution when a pressing force of 4000 kPa was applied for 90 seconds by the supporting member $5a$ was measured.

In Example 1, the difference between the maximum value and the minimum value of the pressure distribution was 675 kPa, and in Example 2, the difference between the maximum value and the minimum value of the pressure distribution was 538 kPa and was a smaller value than that in Example 1. In contrast, in the comparative example, the difference between the maximum value and the minimum value of the pressure distribution was 798 kPa and was a large value.

Evaluation of Sticking State and Uniformity

Process

A fluorocarbon film (thickness: 1 μm) which is a release layer was formed on a support (12-inch glass substrate, thickness: 700 μm) by a CVD method using $C_4F_8$ as reaction gas, under the conditions of a flow rate of 400 sccm, pressure of 70 Pa, high-frequency power of 2800 W, and a deposition temperature of 240° C.

Subsequently, the fluorocarbon film formed as far as a width in a range of 0.5 mm to 1 mm of a peripheral edge portion on the support was removed by supplying (at 10 cc/minute) a stripping solution composed of propylene glycol monomethyl ether and 2-(methylamino) ethanol (propylene glycol monomethyl ether/2-(methylamino) ethanol=7/3 (ratio by weight)) by an EBR nozzle while rotating (at 1500 rpm for 40 seconds) the support. Thereafter, spin drying (at 1500 rpm for 40 seconds) was performed.

Next, an adhesive layer (film thickness: 50 μm) was formed by spin-coating TZNR(registered trademark)-A3007t (manufactured by Tokyo Ohka Kogyo Co., Ltd.) that is an adhesive composition onto a 12-inch silicon wafer and performing heating for 3 minutes at each of 100° C., 160° C., and 200° C.

Subsequently, edge beads on the silicon wafer (protuberance portions of the adhesive layer of a peripheral edge portion of the wafer) were removed by supplying TZNR (registered trademark) HC thinner (manufactured by Tokyo Ohka Kogyo Co., Ltd.) at a feed rate of 20 cc/minute by an EBR nozzle while rotating the silicon wafer.

Sticking Method

A laminate was fabricated by sticking the support having a release layer fabricated as described above and the 12-inch silicon wafer with the adhesive layer provided thereon to each other such that the release layer and a surface on which the adhesive layer was provided come into contact with each other, by using each of the sticking apparatuses according to Example 1, Example 2, and the comparative example. In addition, at the time of the sticking, after the press plate was heated up to 215° C. in each sticking apparatus, a pressing force of 4000 kg was applied for 90 seconds by the supporting member $5a$. Thereafter, a sticking state of each laminate and the uniformity of a thickness were evaluated.

Evaluation of Sticking State

The sticking state of the laminate was evaluated by visual inspection with a laminate uniformly laminated without a void being "A", a laminate having no void being "B", a laminate in which a void is present although it is minute being "C", and a laminate in which a void is present being "D".

The sticking state evaluation results are shown in a section of Sticking in FIG. 3. In the laminate fabricated by the sticking apparatus according to Example 1, a void was not confirmed ("B"). The laminate fabricated by the sticking apparatus according to Example 2 was uniformly laminated without a void ("A"). Further, in the comparative example, a void was clearly confirmed ("D").

Evaluation of Uniformity

The uniformity was evaluated by the total thickness variation (TTV). The TTV shows sticking accuracy and means the difference between the maximum value and the minimum value of the thickness of the entire laminate in a case where, with respect to a laminate fabricated by bonding a wafer substrate and a support plate to each other through an adhesive layer, the thickness in a thickness direction of the laminate is measured based on the back surface of the bonded wafer substrate.

Here, in a case where the value of the TTV is large, it shows that the thickness of the adhesive layer is non-uniform and sticking accuracy is low, and in a case where the value of the TTV is small, it shows that the thickness of the adhesive layer is nearly uniform and sticking accuracy is high. In addition, the maximum value and the minimum value of the thickness of each laminate were measured by a thickness measuring instrument manufactured by Hamamatsu Photonics K. K.

The uniformity evaluation results are shown in a section of Uniformity in FIG. 3. It was confirmed that in the laminate fabricated by the sticking apparatus according to Example 1 and the laminate fabricated by the sticking apparatus according to Example 2, the value of the TTV was smaller than in the laminate fabricated by the sticking apparatus according to the comparative example.

From each evaluation result described above, it could be confirmed that the sticking apparatus according to the present invention could more uniformly stick the substrate and the support plate to each other through the adhesive layer.

The sticking apparatus and the sticking method according to the present invention can be widely used, for example, in a manufacturing process of a miniaturized semiconductor device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A sticking apparatus for manufacturing a laminate which is formed by laminating a substrate, an adhesive layer, and a support in this order by sticking the substrate and the support to each other through the adhesive layer, the sticking apparatus comprising:

a pair of plate members which sandwiches the laminate therebetween, wherein the pair of plate members includes respective press plates, each of which is formed of ceramic, wherein mutually facing surfaces of the respective press plates are formed such that flatness at a time of non-pressing is less than or equal to 1.0 μm; and supporting members which support the plate members, wherein the supporting member supporting at least one of the plate members is located in a form of a plurality of dots or lines adjacent to each other at regular intervals on the plate member.

2. The sticking apparatus according to claim 1, wherein the supporting member is provided in a plurality so as to be adjacent to each other at regular intervals.

3. The sticking apparatus according to claim 2, wherein the plurality of supporting members are provided in the vicinity of an outer peripheral portion of the plate member in a circular pattern so as to be adjacent to each other at regular intervals of 120°, 90°, 72°, 60° or 45°.

4. The sticking apparatus according to claim 3, wherein a supporting member is further provided at a center point of the circle.

5. The sticking apparatus according to claim 2, wherein the supporting member is provided with an adjusting member for pressure adjustment.

6. The sticking apparatus according to claim 2, wherein the supporting member is provided at a position distant from a center point of the plate member in a radial direction in a range of greater than or equal to 65% of a radius and less than or equal to 95% of the radius.

7. A sticking method for manufacturing a laminate which is formed by laminating a substrate, an adhesive layer, and a support in this order by sticking the substrate and the support to each other through the adhesive layer, the sticking method comprising:

supporting at least one plate member of a pair of plate members sandwiching the laminate therebetween by supporting members located in a form of a plurality of dots or lines adjacent to each other at regular intervals on the plate member, and pressing the plate members by the supporting members when sticking the substrate and the support to each other, wherein the pair of plate members includes respective press plates, each of which is formed of ceramic, wherein mutually facing surfaces of the respective press plates are formed such that flatness at a time of non-pressing is less than or equal to 1.0 μm.

8. The sticking method according to claim 7, wherein pressing forces of the supporting members pressing the plate members are adjusted such that a pressing force which is applied to the laminate becomes uniform.

9. The sticking method according to claim 8, wherein the difference between the maximum value and the minimum value of the pressure distribution of the pressing force which is applied to the pair of plate members be adjusted into a range of less than or equal to 700 kPa.

* * * * *